United States Patent [19]

Kwon

[11] Patent Number: 5,548,319
[45] Date of Patent: Aug. 20, 1996

[54] GRADATION DATA METHOD PROCESSING INCLUDING REPEATED READING AND RECORDING OF HIGH DENSITY DATA

[75] Inventor: Sang-Chul Kwon, Suwon, Rep. of Korea

[73] Assignee: Samsung Electronics Co., Ltd., Kyungki-do, Rep. of Korea

[21] Appl. No.: 126,395

[22] Filed: Sep. 24, 1993

[30] Foreign Application Priority Data

Sep. 25, 1992 [KR] Rep. of Korea ............... 1992-17524
Sep. 14, 1993 [KR] Rep. of Korea ............... 93-18456

[51] Int. Cl.$^6$ .................................................. B41J 2/32
[52] U.S. Cl. ................................... 347/183; 358/298
[58] Field of Search .......................... 347/183, 15, 131, 347/144, 240, 251, 185; 358/298, 455, 456, 458, 459

[56] References Cited

U.S. PATENT DOCUMENTS

| | | | |
|---|---|---|---|
| 4,532,523 | 7/1985 | Tanaka | 358/298 X |
| 4,689,694 | 8/1987 | Yoshida | 358/298 |
| 4,806,950 | 2/1989 | Sekine et al. | 358/298 X |
| 5,099,258 | 3/1992 | Hirayama | 347/183 |
| 5,128,692 | 7/1992 | Reisch | 358/298 X |

Primary Examiner—Benjamin R. Foller
Assistant Examiner—David Yockey
Attorney, Agent, or Firm—Sughrue, Mion, Zinn, Macpeak & Seas

[57] ABSTRACT

A gradation data processing method for shortening printing time by processing a signal per bit column makes a heating element generate heat in the mid portion of one line printing time for a low gradation and makes the heating element repeatedly generate heat in all ranges during high gradation printing. The gradation data processing method includes steps for storing per line an N-bit picture data capable of expressing the $2^N$ gradation, reading per predetermined bit column the N-bit picture data capable of expressing the $2^N$ gradation and printing per the predetermined bit column the picture data read during the reading step while allowing the picture data to have respectively different heating time per the predetermined column.

11 Claims, 6 Drawing Sheets

| LSB | | | | | | | MSB |
|---|---|---|---|---|---|---|---|
| 1 | 0 | 0 | 1 | 0 | 0 | 0 | 0 |

FIG. 2B
(prior art)

20μsec

GRADATION DATA METHOD PROCESSING INCLUDING REPEATED READING AND RECORDING OF HIGH DENSITY DATA

BACKGROUND OF THE INVENTION

1. Field of the Invention

The present invention relates to a gradation data processing method and apparatus thereof in a printer, and more particularly, to a gradation data processing method and apparatus therefor in a printer for performing a signal-processing per bit column of a picture data capable of expressing a predetermined gradation to thereby reduce a printing time.

Furthermore, a heating element is heated in the middle of one line printing period in the case of low gradation, and in the case of high gradation, the heat element is heated by dividing all ranges of one line printing period, so that the tone can be softened.

In other words, the present invention relates to a gradation data processing method and apparatus therefor in a printer wherein expression of low gradation is performed in the center area of one line printing period to thereby concentrate the energy, so that a high quality of picture can be obtained and, in the case of high gradation, the gradation is evenly executed in a printing period other than the period in which the low gradation is expressed, to thereby apply an even energy, so that a mellow picture can be obtained.

2. Description of the Prior Art

Conventionally, as a technique to provide a color printing, an ink jet, a heat-transfer, device laser and the like have been proposed. A heat-transfer color printing providing a high quality output at an affordable price has used heat in transferring the ink onto a piece of paper or a sheet of positive film from an ink sheet (dye hauler).

As a new type of color heat-transfer printer, a sublimating heat-transfer printer has been proposed for heating a solidified ink (or dye) to directly convert the same to a gaseous state, so that the ink can be transferred onto the paper.

The sublimating heat-transferring printer applies an adequate energy to every dot of a thermal print head in accordance with a gradation of printed picture data so that the ink amount sublimated in accordance with change of a heating amount value in a heating element can be adjusted to thereby express the gradation of a picture.

Figure 1:
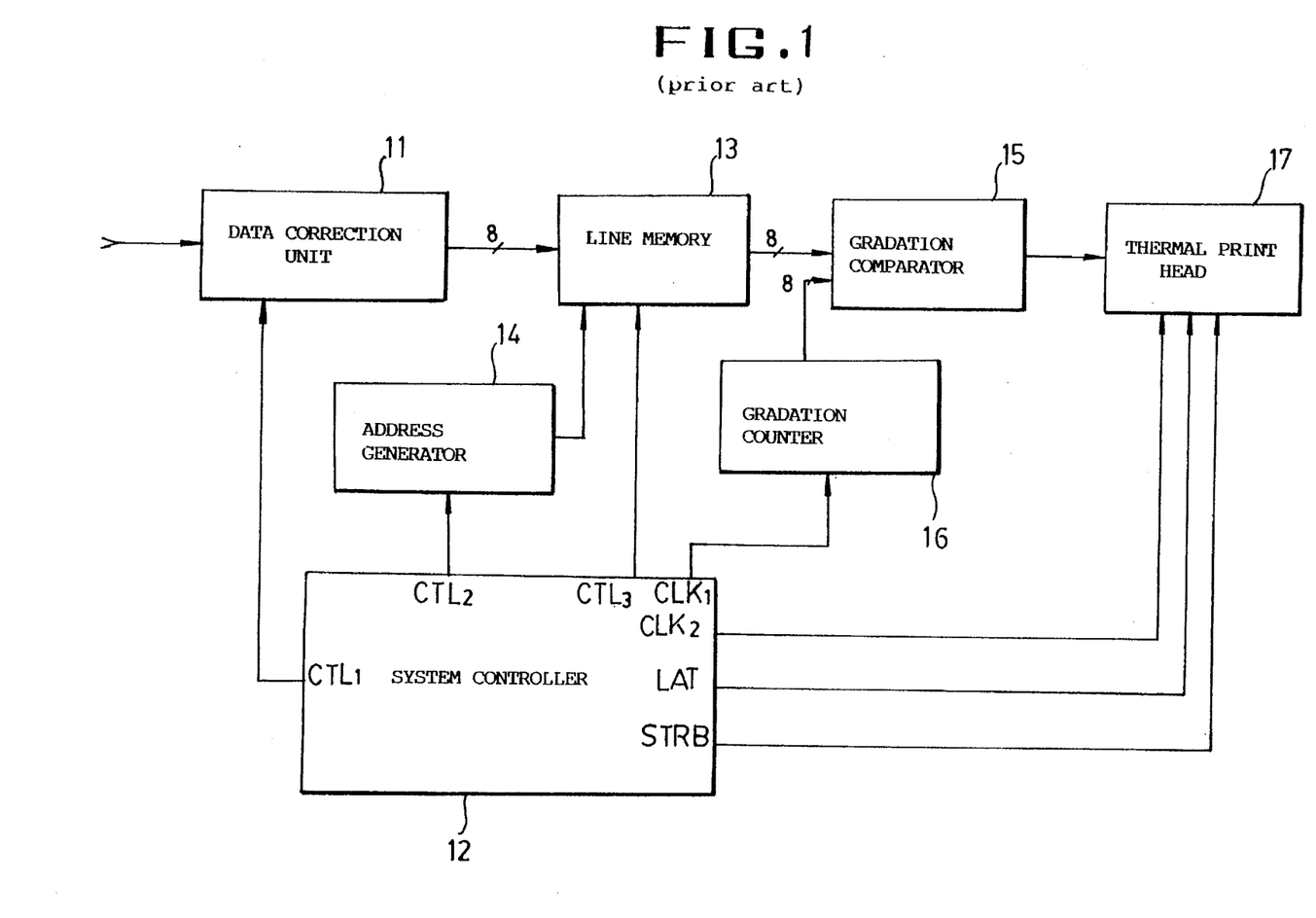
FIG. 1 is a block diagram for illustrating a typical sublimating heat transfer printer.

FIG. 1 is a block diagram for illustrating a typical sublimating heat-transfer printer capable of expressing 256 gradations.

Figure 2A:
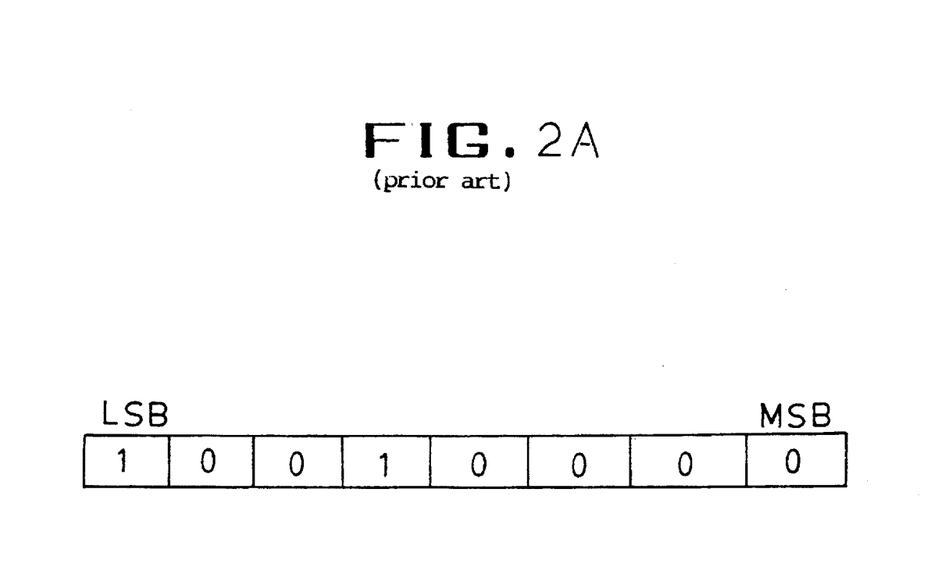
FIGS. 2A and 2B are waveform drawings of a picture data and a strobe signal employed in FIG. 1.
Figure 2B:
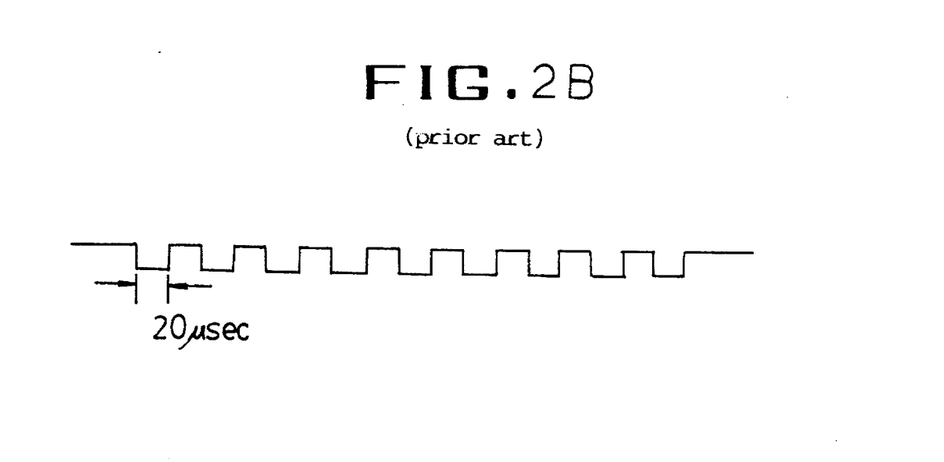

FIG. 2(a) and 2(b) are waveform drawings of a picture data and a strobe signal shown in FIG. 1, wherein the picture data and the strobe signal for expressing 9 gradations are shown when the strobe time (t) for expressing one gradation by way of heating the heating element is 20 μsec.

The apparatus in FIG. 1 comprises: a data correction unit 11 for correcting (resistance correction, color correction, etc.) picture data (an 8-bit data capable of expressing 256 gradations) input from a frame memory; a line memory (or buffer) 13 for storing per line the corrected picture data from the data correction unit 11; an address generator 14 for assigning a read/write address of the line memory 13; a gradation counter 16 for repeating counts for as many as possible numbers (from "0" to "255" in case of 256 gradations) expressible in the printer, to thereby output the same as comparison reference data; a gradation comparator 15 for comparing the comparison reference data counted from the gradation counter 16 with the picture data output from the line memory 13; a thermal print head 17, internally housing a shift register, a latch and a heating element, for sublimating the ink to perform the printing per line in accordance with the comparison result at the gradation comparator 15; and a system controller 12 for controlling the aforesaid devices.

The system controller 12 outputs control signals CTL 1, CTL 2 and CTL 3 respectively to the data correction unit 11, address generator 14 and the line memory 13 and outputs to the thermal print head 17 a clock signal CLK 2, a latch signal LAT and a strobe signal STRB having an enable time t of 20, μsec for expressing one gradation.

Accordingly, in the abovementioned gradation processing apparatus in a printer, if the image data transmitted from the frame memory is input to the data correction unit 11, the data correction unit 11 performs various data corrections such as color correction and the like on the gradation data input in accordance with the control signal CTL 1 of the system controller 12 to thereafter transmit the same to the line memory 13 through an 8-bit parallel data bus.

The system controller 12 outputs the control signal CTL 2 to the address generator 14, so that address data can be generated, and outputs the control signal CTL 3 in order to control the line memory 13 in a writable state.

Accordingly, the 8-bit picture data transmitted to the line memory 13 is stored in the line memory 13 in correspondence with the addresses generated from the address generator 14.

If one line portion of picture data storage is completed at the line memory 13, the system controller 12 applies the control signal CTL 3 corresponding to the writable state to the line memory 13 and, by utilizing the address generator 14, outputs predetermined gradation data stored in the line memory 13.

The picture data output from the line memory 13 is input to the gradation comparator 15 through an 8-bit transmission line.

If the gradation counter 16 starts counting by means of the clock CLK 1 of the system controller 12, the gradation comparator 15 compares the picture data input from the line memory 13 with the 8-bit of comparison reference data output from the gradation counter 16.

If the picture data input from the line memory 13 is above the comparison reference data input from the gradation counter 16, the gradation comparator 15 outputs a binary data of "1", while, if the picture data is below the comparison reference data, then the gradation comparator 15 outputs a binary data of "0".

As seen from the above, the comparison reference data output from the above-mentioned gradation counter 16 is utilized for comparison with all picture data output from the line memory 13.

The binary data output from the gradation comparator 15 is transmitted to a shift register disposed within the thermal print head 17 (not shown) and is shifted by the clock CLK 2 of the system controller 12.

The binary data stored in the thermal print head 17 is utilized in an operation of the heating element for sublimating the ink by means of the latch signal LAT and the strobe signal STRB applied by the system controller 12.

In other words, the binary data stored in the shift registers of the thermal print head 17 are latched by the latch signal LAT, and the heating elements corresponding to the binary data of "1" are heated for 20, μsec by way of the strobe signal STRB for enabling each heating element.

As seen from the foregoing, if one gradation expression is finished, the system controller 12 outputs the picture data stored in the line memory 13 to the gradation comparator 15 again, so that the gradation counter 16 can be controlled to generate other predetermined comparison reference data.

The gradation comparator 15 outputs a binary data of "1", if the picture data input from the line memory 13 is above the comparison reference data, while, if the picture data is below the comparison reference data, the comparator 15 outputs a binary data of "0" to the thermal print head 17.

Just like the one gradation expression thus described, the gradation comparator 15 outputs to the thermal print head 17 a compared result between all the data stored in the line memory 13 and the comparison reference data.

If the binary data which is the comparison result (compared) between the one line portion of the picture data and the above-mentioned comparison reference data, is all transmitted, the thermal print head 17 drives the heating elements corresponding to the binary data of "1" stored in the shift register.

By way of example, in the case of a data having 9 gradations as shown in FIG. 2a, the gradation comparator 15 outputs the binary data of "1" nine times and the thermal print head 17 is heated for 180 μsec (20 μsec×9) by the strobe signal as shown in FIG. 2b.

In other words, because, whenever a gradation comparison for one line portion of picture data is completed, the system controller 12 outputs the strobe signal STRB of 20 μsec, so the thermal print head 17 is heated when the strobe signal STRB is output, e.g., nine times in the case of a 9-gradation data to thereby express 9 gradations possessed by the picture data.

If a clock CLK 2 frequency in this type of printer is 5 MHz, 200 nsec (T=1/f=⅕ [MHz]) is necessary to transmit one data, and if the number of heating elements in a line is 1,280, a total of 256 μsec is needed to transmit all the data for one line.

Accordingly, at least more than 256 μsec are necessary to express one gradation, so that a printer capable of a 256-gradation (0–255) expression needs 65 μsec (256, μsec×255) for one line print.

Accordingly, in the printer thus described, if a thermal print head of a 10-data input method equipped respectively with 10 line memories and 10 gradation comparators for processing the data in parallel in order to shorten the time for comparison of the data and transmission of the result thereof is constructed, 200 nsec is needed to transmit one data, which implies that 25.6 μsec (1280/10×200 μsec) is necessary to transmit the 1,280 data.

As seen from the foregoing, because more than 25.6 μsec is needed to express one gradation, a printer capable of expression of 256 gradations needs 6.5 msec (25.6 μsec× 255) for one line printing.

As described above, the typical printer must repeatedly compare the data per gradation to obtain an expression of 256 gradations. There has been a problem in that, in order to reduce the time needed for a gradation expression on one line of picture data, the number of the line memories and gradation comparators for transmission of a heating element driving data to the thermal print head has to be increased.

Furthermore, there is another problem in that an accurate expression of gradation has not been realized due to a front line influence caused by a thermal accumulation because the thermal print head is heated in all over the front and rear portions during the one line printing time.

Typical of the prior art is U.S. Pat. No. 4,745,413, entitled Energizing Heating Elements of a Thermal Printer, which has been proposed to present a technique of expressing an odd number gradation first to thereafter express an even number gradation.

However, in the aforementioned U.S. Pat. No. 4,745,413, because the energy is dissipated due to the heating at the mid portion and rear portion in the case of low gradation, there has been a problem in the expression of the low gradation.

Furthermore, even in the foregoing U.S. Pat. No. 4,745,413, the gradation data has to be repeatedly compared for each gradation to thereby prolong the printing time, and in order to reduce the printing time, there has been a problem in that the numbers of the line memory and gradation comparator for transmitting the driving data have to be increased on the thermal print head.

SUMMARY OF THE INVENTION

In order to solve the aforementioned problems, it is an object of the present invention to provide a gradation data processing method and apparatus therefor in a printer for decreasing a printing time by way of reduction in the data amount transmitted to a thermal print head even without increased line memories.

Furthermore, it is another object of the present invention to provide a gradation data processing method and apparatus therefor in a printer for performing a swift printing in a simple construction not using a gradation counter, gradation comparators and the like.

It is a further object of the present invention to have the heating realized in the mid portion of one line heating time in the case of low gradation so that a high quality of gradation can be obtained, and in the case of high gradation, the object is to have a divided driving realized in all over the whole ranges of one line printing period so that the tone can be softened and the influence from the heat coming from the front line can be reduced to a minimum as well.

In accordance with one aspect of the present invention, there is provided a gradation data processing method in a printer, including steps for storing per line an N-bit picture data capable of expressing a $2^N$ gradation; reading per predetermined bit column the N-bit picture data capable of expressing the $2^N$ gradation; and printing per the predetermined bit column the picture data read from the second step while allowing the picture data to have respectively different heating time per the predetermined bit column.

In accordance with another aspect of the present invention, there is provided a gradation data processing method in a printer, including steps for storing per line a picture data capable of expressing a $2^N$ gradation; dividing the picture data into a low gradation data and a high gradation data to thereafter read from a mid portion of one line printing period in the case of low gradation data and to read and output from both the front and rear portions of one line printing period in the case of high gradation data; and heating the heating element by dividing the whole time for expressing the high gradation into front and rear portions to thereby perform the printing even though the printing is performed in accordance with the gradation data read from the above.

In accordance with still another aspect of the present invention, there is provided a gradation data processing apparatus in a printer, including: a data storage device for storing per line an N-bit picture data capable of expressing a $2^N$ gradation; a data output circuit for reading per predetermined bit column the N-bit picture data capable of expressing the $2^N$ gradation from the data storage means to thereafter output the same; a system controller for generating a strobe signal, so that the N-bit picture data can have respectively different heating times per the predetermined bit column; and a printing device for energizing the heating element to be heated for the predetermined period of time to thereby express the picture of gradation in accordance with a control signal output from the system controller when the picture data output from the data output circuit per the predetermined bit column is input.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Henceforth, a gradation data processing method and apparatus therefor in a printer in accordance with the preferred embodiment of the present invention will be described in detail with reference to the accompanying drawings.

Figure 3:
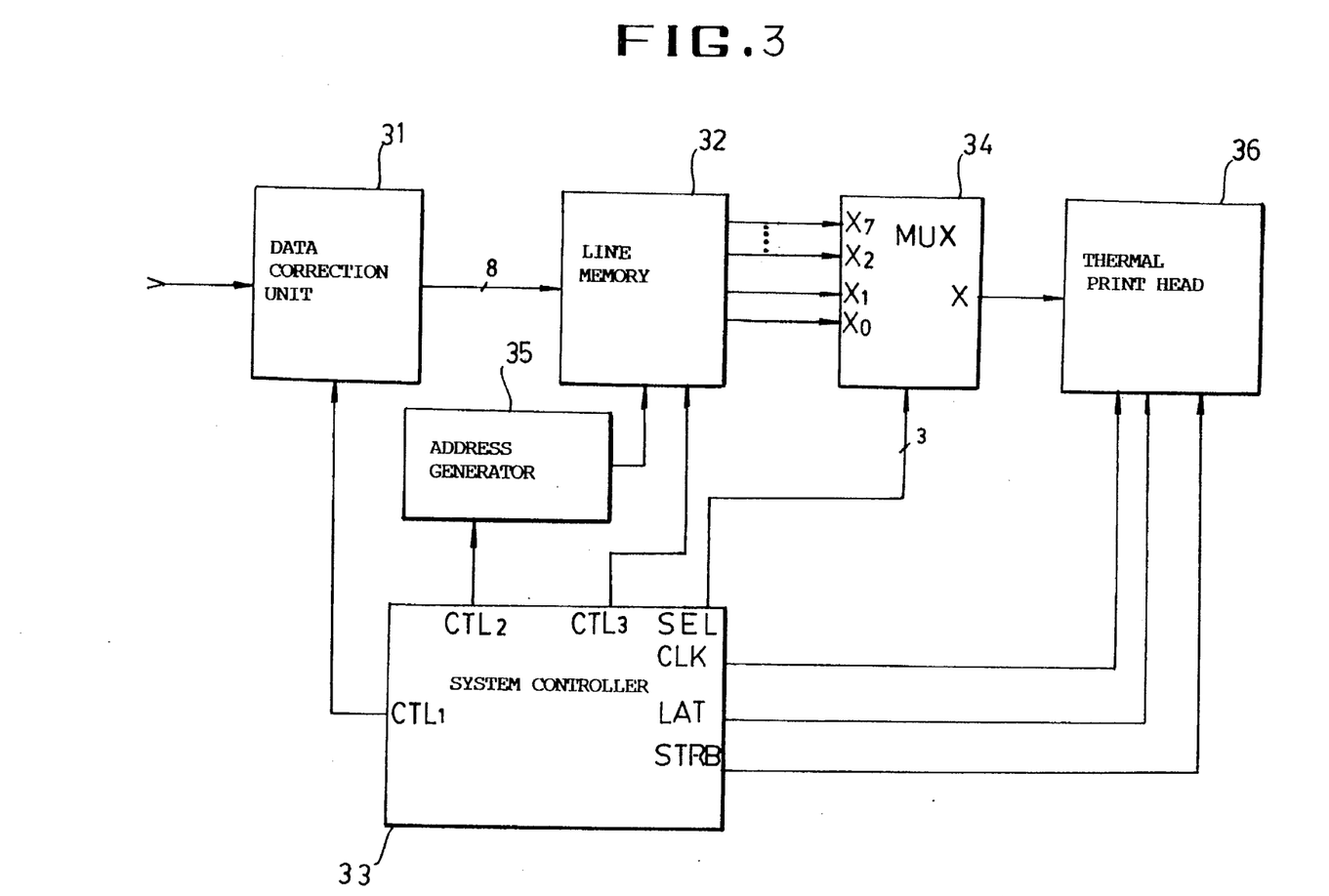
FIG. 3 is a block diagram illustrating one embodiment of a sublimating heat transfer printer in accordance with the present invention.

FIG. 3 is a block diagram for illustrating one preferred embodiment for a sublimating heat transfer printer in accordance with the present invention, and illustrates a sublimating heat transfer printer capable of expressing 256 gradations ($2^N$ gradation; N=0, 1, 2, . . . ; A case of N=8 is explained for the present invention) against the color.

In FIG. 3, the data correction unit 31 performs various corrections on to-be-printed picture data (resistance correction, color correction and the like) input from a frame memory (not shown) in accordance with the control signal CTL1 coming from the system controller 33.

The line memory 32 acting as data storage means stores one line portion of picture data coming from the data correction unit 31 in an address output from an address generator 35 and reads to thereafter output the same.

At this location, the address generator 35 is controlled by a control signal CTL2 output from the system controller 33 to thereby generate the addresses and the line memory 32 performs a read/write operation in accordance with the control signal CTL3 output from the system controller 33.

A multiplexer 34 acting as data output means selects per the predetermined bit column the 8-bit capable of expressing 256 gradations output from the line memory 32, thereby outputting the same in accordance with a selection signal SEL coming from the system controller 33.

The thermal print head 36 of the printing means is heated per bit column during respectively different heating times when the picture data output from the multiplexer 34 is received.

Here, the thermal print head 36 includes: a shift register for storing sequentially per bit column the picture data of one line portion output from the multiplexer 34 in accordance with the clock CLK of the system controller 33; a latch for receiving in parallel the data stored in the shift register in accordance with a latch signal LAT of the system controller 33 to store the same; and a heating element for performing a gradation expression by heating in accordance with the strobe signal STRB output from the system controller 33 and having respectively different times per bit column and in accordance with the data stored in the latch.

Figure 4A:
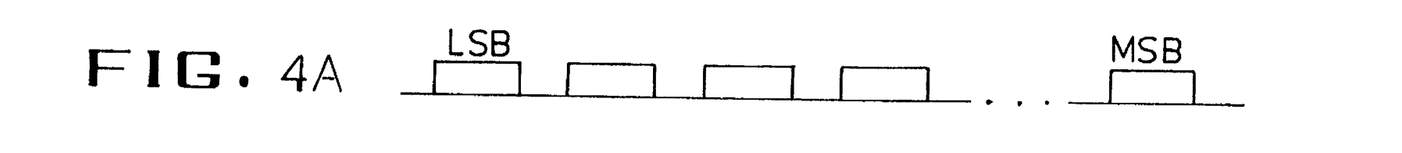
FIGS. 4A–4E are picture data and signal waveform drawings for illustrating operation of the circuitry shown in FIG. 3.

FIGS. 4A–4E are picture data and signal waveform drawings for illustrating operation of the block diagram shown in FIG. 3, among which FIG. 4A is a binary data block diagram for constructing one line portion of picture data constructed in the 8-bit from a Least Significant Bit LSB to a Most Significant Bit MSB per bit column.

Figure 4B:
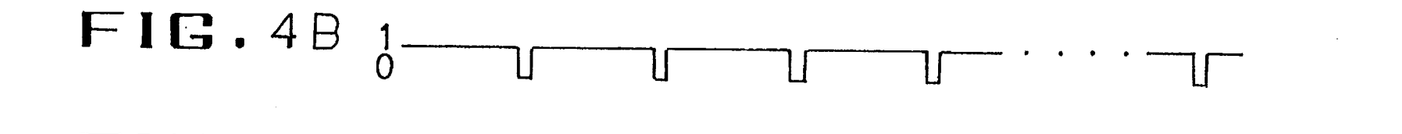
Figure 4C:
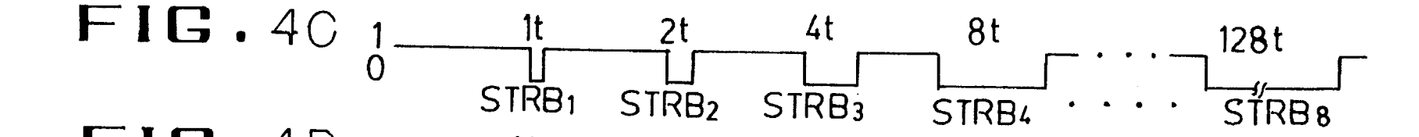

FIG. 4B is a drawing for illustrating a latch signal, and FIG. 4C is a drawing for illustrating a strobe signal applied to the thermal print head 36, a drawing for a case where the multiplexer 34 has selected the bit column in an order from the LSB to the MSB by way of the system controller 33 shown in FIG. 3. In the above, the strobe time per N-bit gradation data for expression of 256 gradations become $(2^m)t$ respectively, where m represents a bit column and in the case of 8-bit where the picture data can express 256 gradations, m ranges 0–7 from a LSB column to a MSB column.

Accordingly, in order to express 256 gradations, strobe signals, STRB1, STRB2, STRB3, STRB4, STRB5, STRB6, STRB7 and STRB8 are outputted during 1t, 2t, 4t, 8t, 16t, 32t, 64t and 128t respectively.

Here, t is a time needed for expression of one gradation and is made to represent 20, μsec in the present invention.

Figure 4D:
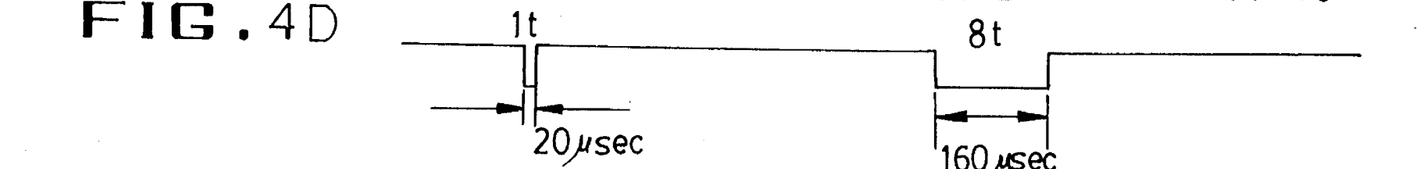

FIG. 4D is a drawing for illustrating a heating time of the thermal print head for expression of 9 gradations in accordance with the present invention.

Figure 4E:
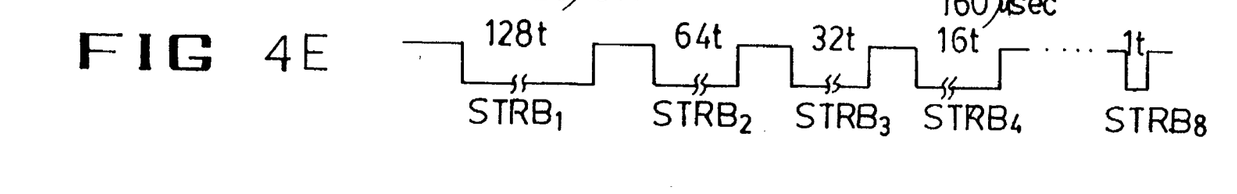

FIG. 4E is a drawing for illustrating another embodiment of a strobe signal applied to the thermal print head 36, which is a drawing for a case where the multiplexer 34 has selected one line portion of picture data in an order from the MSB to the LSB by way of the system controller 33 shown in FIG. 3.

Even here, the respective strobe time per gradation data of the 8-bit in order to express 256 gradations is also $(2^m)t$ as shown in FIG. 4C, and in order to express the 256 gradations, the strobe signals, STRB 1, STRB 2, STRB 3, STRB 4, STRB 5, STRB 6, STRB 7 and STRB 8 are respectively outputted during 128t, 64t, 32t, 16t, 8t, 4t, 2t, and 1t. Reference symbol m also represents the bit column, and Reference symbol t, necessary for expression of one gradation, is made to represent 20, μsec in the present invention.

An operating sequence of the present invention will be described in detail with reference to the accompanying drawings.

In FIG. 3, data correction of the data correction unit 31 and picture data storage into the line memory 32 are the same as those of the typical apparatus, the detailed operational explanation of which therefore will be omitted.

If one line portion of picture data is stored in the line memory 32, the system controller 33 controls the address generator 35 and the line memory 32 in order for the picture data stored in the line memory 32 to be output to the multiplexer 34.

In other words, the system controller 33 outputs the predetermined control signal CTL2 to the address generator 35 and outputs to the line memory 32 the control signal CTL3 for enabling data readout.

Accordingly, the line memory 32 outputs the picture data corresponding to an address value generated from the address generator 35 to an 8-bit parallel data bus.

Furthermore, if the data output of the line memory 32 is started, the system controller 33 applies to the multiplexer 34 a 3-bit selection signal SEL for allowing the multiplexer 34 to select the same input terminal until one line portion of picture data stored in the line memory 32 is completely output, so that an input terminal X0 corresponding to LSB can be selected.

The binary values of LSB output from the multiplexer 34 is stored in a serial input/parallel output shift register (not shown) disposed in the thermal print head 36.

In other words, because the 8-bit picture data sequentially coming from the line memory 32 is input to an input terminal X0 corresponding to LSB by the multiplexer 34, only binary data of one line portion of LSB column is repeatedly transferred to the thermal print head 36.

The thermal print head 36 shifts the binary data in line with the clock CLK outputted from the system controller 33, thereafter storing the same in the shift register.

As illustrated in FIG. 4A, if all the binary data in LSB among the picture data stored in the line memory 32 is stored in the shift register of the thermal print head 36 by the clock signal CLK of the system controller 33, the system controller 33 transfers to the thermal print head 36 a latch signal LAT indicated in a first low level shown in FIG. 4B and a strobe signal STRB1 indicated in a first low level shown in FIG. 4C.

In other words, the thermal print head 36 transfers in parallel to the latch the data stored in the shift register by way of the latch signal LAT to thereby drive for 1T the heating elements corresponding to the binary data of "1" stored in the shift register by utilizing the strobe signal STRB1.

Accordingly, the thermal print head 36 records on a printing medium one gradation possessed by the picture data.

If one line portion of picture data is completely output from the line memory 32, the system controller 33 controls the address generator 35 to thereby output the picture data stored in the line memory 32 to the multiplexer 34 in the same order as in one gradation expression mentioned above.

At the same time, the system controller 33 outputs a selection signal SEL, so that the multiplexer 34 can select the other input terminal X1.

Accordingly, the binary data corresponding to the second place of the binary among the 8-bit picture data output from the line memory 32 is stored in the shift register of the thermal print head 36 through an output terminal X of the multiplexer 34.

As seen from the foregoing, the data belonging to a second data block shown in FIG. 4A among the one line portion of picture data is shifted by the clock CLK of the system controller 33 and stored in the aforesaid shift register, and utilized for the heating elements to express 2 gradations by the latch signal LAT and strobe signal STRB2 indicated in a second low level shown in FIGS. 4B and 4C.

Likewise, the system controller 33 outputs eight times to the multiplexer 34 one line portion of picture data stored in the line memory 32 in order to express all the 256 gradations, while the system controller 33 outputs the selection signal SEL in order that the multiplexer 34 may select the input terminals X0, X1, X2, X3, X4 . . . X7.

Therefore, the picture data per bit column as shown in FIG. 4A is obtained from the output terminal X of the multiplexer 34.

Furthermore, as seen in FIG. 4c, 8 kinds of strobe signals STRB1, STRB2, STRB3 . . . STRB8 having mutually different strobe time (1t, 2t, 4t, 8t, 16t, 32t, 64t, 128t) per gradation column are generated to thereby be supplied to the thermal print head 36, so that a complete 256-gradation can be expressed.

By way of example, in order to express a 9-gradation, because the binary data value of LSB among the 8-bit picture data "0000 1001" is "1", the heating elements of the thermal print head 36 are heated during a predetermined period of time (t=20 μsec) indicated in the first low level shown in FIG. 4D.

However, because the binary data corresponding to the second and the third place of the binary have data value of "0", the heating elements are not driven while the strobe signals STRB2 and STRB3, indicated in the second and the third low level shown in FIG. 4C, are applied.

If a fourth binary data of "1" in the picture data is latched to the thermal print head 36, the thermal print head 36 receives the strobe signal STRB4 shown in FIG. 4C to drive the heating elements for 4t(=160 μsec) as illustrated in FIG. 4D.

Accordingly, the thermal print head 36 uses the heat generated during a period of 180 μsec(1t+4t=20 μsec+160 μsec) to thereby sublimate sublimating dyestuff of a film, so that a picture expressed as a 9-gradation can be printed on the paper.

By the method thus described, the printer completes the picture gradation expression against the respective yellow, magenta and cyan colors stored in the frame memory to thereby print a complete color picture.

Meanwhile, it should be apparent that the purpose of the invention can be obtained by having the strobe signals respectively outputted for 128t, 64t, 32t, 16t, 8t, 4t, 2t, and 1t as shown in FIG. 4E after the multiplexer 34 is made to select in the order of from MSB to LSB by the selection signal SEL output from the system controller 33.

A detailed explanation thereof will be omitted because it will be easily understood based on the aforesaid explanation by one of ordinary skill in the art.

Figure 5:
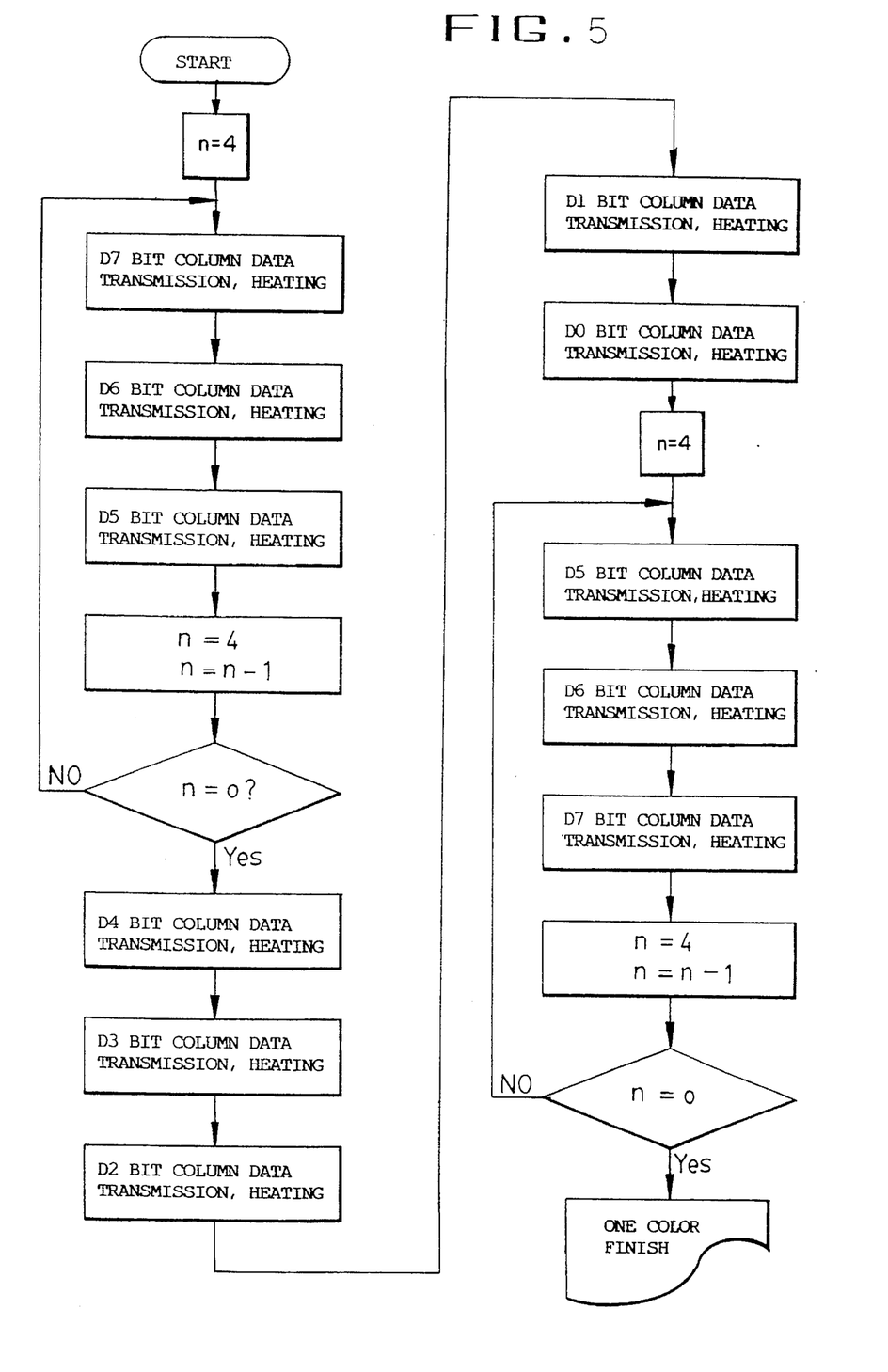
FIG. 5 is a flow chart for illustrating another embodiment of a gradation data processing method in a printer in accordance with the present invention.

FIG. 5 is a flow chart for illustrating another embodiment of a gradation data processing method in a printer in accordance with the present invention.

An explanation about the preferred embodiment will be described in detail with reference to the gradation data processing apparatus illustrated in FIG. 3 and the picture data and signal waveform drawings shown in FIG. 6.

In FIG. 3, the picture data input from the frame memory to the data correction unit 31 is output to the line memory 32 after unit 31 is done with various corrections such as the resistance correction, color correction and the like by the control signal CTL 1 of the system controller 33.

The line memory 32 stores one line portion of picture data input from the data correction unit 31 to the address output from the address generator 35, reads and outputs the same.

Here, the address generator 35 is controlled by the control signal CTL 2 output from the system controller 33 to thereby generate the addresses, and the line memory 32 performs the read/write operation in accordance with the control signal CTL 3 output from the system controller 33.

The multiplexer 34 of the data output means distinguishes the 8-bit capable of expressing 256 gradations output from the line memory 32 into low gradation data (or bit) and high gradation data, while the low gradation data is read from the middle portion of one line printing period and the high gradation data is selectively output from the front and rear portions of one line printing period per the predetermined bit column.

Figure 6:
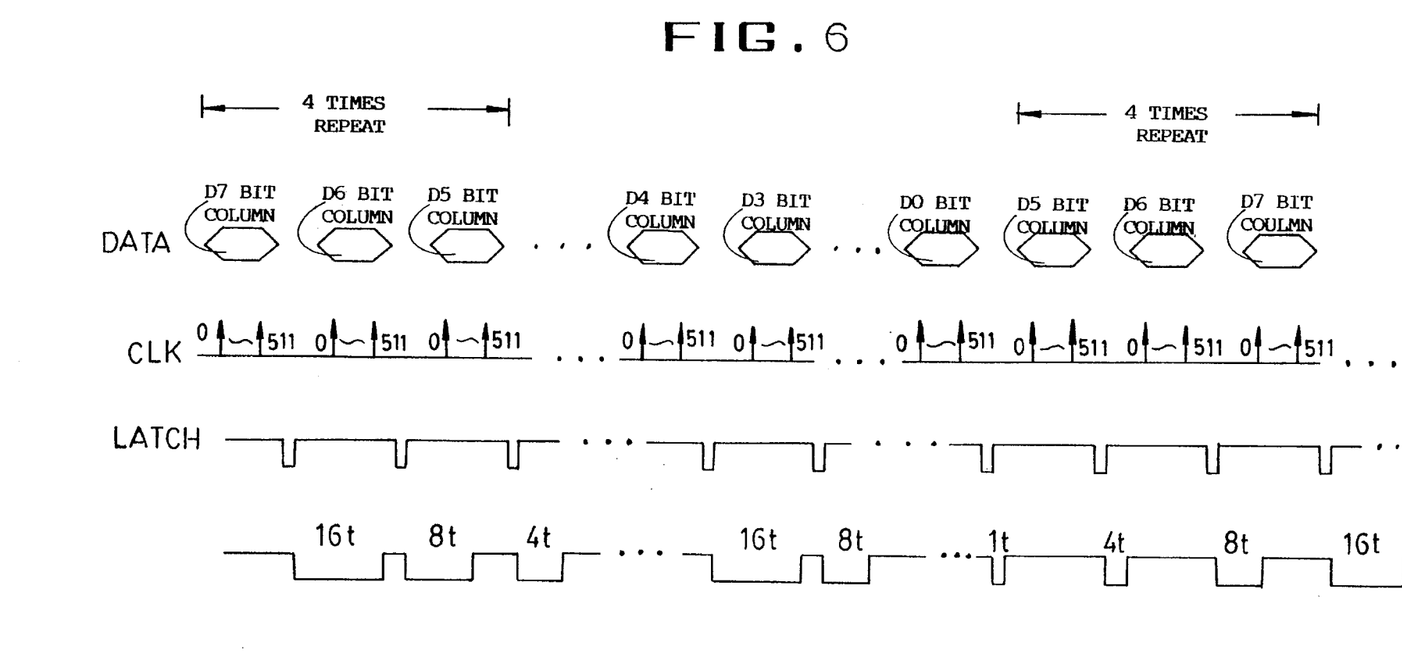
FIG. 6 illustrates picture data and signal waveform drawings for explaining the method performed by FIG. 5 using the circuitry illustrated in FIG. 3.

In other words, the system controller 33 outputs the selection signal SEL to allow the multiplexer 34 to select the input terminal X7, so that, as illustrated in FIG. 6, one line (hereinafter 512 heating elements) portion of data belonging to MSB column (D7 bit column) can be output.

The system controller 33 also outputs the clock CLK to the thermal print head 36, so that one line portion of data belonging to MSB column output from the multiplexer 34 can be stored sequentially in the shift register comprising the thermal print head 36.

Then, the system controller 33 outputs the latch signal LAT, stores in the latch one line portion of data belonging to the MSB column stored in the shift register and outputs a strobe signal STRB having a time as long as $1/(2n)$ (n is the frequency of reading the picture data in order to express the high gradation) among the heating time $(2^m)t$ of the heating element per bit column, so that the heating element can be heated to thereby express (print) the gradation.

At this moment, because the bit column is 7, the heating time of the heating element against each data belonging to the MSB column becomes 128t, and if the high gradation is repeated n times (4 times for the present invention) to thereby perform the printing, the heating time becomes $128t/(2\times 4)=16t$ as illustrated in FIG. 6.

In other words, the strobe signal is so outputted that an energy having a size as much as $1/(2n)$ possessed by the MSB column data is applied.

As seen from the above, if the printing is completed for each data portion of one line belonging to the MSB column, the system controller outputs the selection signal SEL to allow the multiplexer 34 to select the input terminal X6, so that one line portion data belonging to the next bit column (D6 bit column) can be output as illustrated in FIG. 6.

The system controller 33 also outputs a clock CLK to the thermal print head 36 to thereby store sequentially one line portion data belonging to the D6 bit column output from the multiplexer 34 on the shift register comprising the thermal print head 36.

Hereinafter, the system controller 33 outputs a latch signal LAT, so that one line portion data belonging to the MSB column stored in the shift register can be stored in the latch and a strobe signal STRB having a time as much as ½n among the heating time $(2^m)t$ of the heating element per bit column can be output to thereby heat the heating element for expression of the gradation.

At this moment, because the bit column is 6, the heating time of the heating element for each data belonging to the bit column becomes 64t, therefore, if the printing is performed by repeating the high gradation 4 times, the heating time becomes $64t/(2\times 4)=8t$ as illustrated in FIG. 6.

As seen from the forgoing, the system controller 33 outputs the selection signal SEL to allow the multiplexer 34 to select the input terminal X5 and outputs the strobe signal STRB in order that the heating element should be heated for 4t against one line portion data belonging to a D5 bit column.

Then, the system controller 33 continues to output the selection signal SEL to allow the multiplexer 34 to repeatedly select the input terminals X7, X6 and X7 four times, so that the printing can be performed against the bit column for expression of the high gradation as described above.

As mentioned above, if the printing is performed against the bit column for expression of the high gradation, the system controller 33 outputs the selection signal SEL to express the low gradation, and the multiplexer 34 selects the input terminal X4 and outputs one line portion data belonging to the bit column (D4 bit column) as illustrated in FIG. 6.

The system controller 33 also outputs a clock CLK to the thermal print head 36 to thereby store sequentially one line portion data belonging to the D4 bit column output from the multiplexer 34 in the shift register comprising the thermal print head 36.

Then, the system controller 33 outputs the latch signal LAT to store one line portion data belonging to the MSB column stored in the shift register in the latch, and outputs a strobe signal STRB having the heating time of $(2^m)t$ of the heating element per bit column to thereby heat the heating element for expression of the gradation.

At this moment, because the bit column is 4, the heating time of the heating element against each data belonging to the bit column becomes 16t.

As seen from the foregoing, the system controller 33 outputs the selection signal SEL to allow the multiplexer 34 to sequentially select the input terminals X3, X2, X1 and X0 and outputs the strobe signal STRB in order that the heating element can be heated for 8t, 4t, 2t and 1t respectively with respect to one line portion data belonging to D3, D2, D1 and D0 bit columns.

As mentioned above, if the performance for expression of low gradation is completed, the system controller 33 outputs the selection signal SEL to express the high gradation, and the multiplexer 34 selects the input terminal X5 to thereby output one line portion data belonging to the bit column (D5 bit column) as illustrated in FIG. 6.

The system controller 33 also outputs a clock CLK to the thermal print head 36 to thereby store one line portion data belonging to D5 bit column output from the multiplexer on the shift register comprising the thermal print head 36.

Then, the system controller 33 outputs the latch signal LAT to store in the latch the one line portion data belonging to the D5 bit column stored in the shift register, and outputs a strobe signal STRB having a time as long as $1/(2n)$ (n is the frequency of reading the picture data for expression with high gradation) among the heating time $(2^m)t$ of the heating element per bit column, so that the heating element is heated to thereby express (print) the gradation.

At this moment, because the bit column is 5, the heating time of the heating element against each data belonging to the MSB column becomes 32t, and if the printing is performed by repeating the high gradation n times (4 times in the invention), the heating time becomes $32t/(2\times 4)=4t$ as illustrated in FIG. 6.

In other words, the strobe signal is output so that an energy as size as $1/(2n)$ possessed by the data of the D5 bit column can be applied.

As seen from the foregoing, if the printing is completed for each data of one line portion belonging to the MSB column, the system controller outputs the selection signal SEL to allow the multiplexer 34 to select the input terminal X6, so that one line portion data belonging to the next bit column (D6 bit column) can be output.

The system controller 33 also outputs the clock CLK to the thermal print head 36 to thereby store sequentially one line portion data belonging to the D6 bit column output from the multiplexer 34 on the shift register comprising the thermal print head 36.

Then, the system controller 33 outputs the latch signal LAT to thereby store in the latch one line portion data belonging to the MSB column stored in the shift register and outputs a strobe signal STRB having a time as long as $1/(2n)$ among the heating time $(2^m)t$ of the heating element per bit column to heat the heating element for expression of the gradation.

At this moment, because the bit column is 6, the heating time of heating element for each data belonging to the bit column becomes 64t, and if the printing is done by repeating the high gradation four times, the heating time becomes $64t/(2\times4)=8t$ as illustrated in FIG. 6.

As seen from the foregoing, the system controller 33 outputs the selection signal SEL to allow the multiplexer 34 to select the input terminal X7, and outputs the strobe signal STRB in order that the heating element can be heated for 16t against one line portion data belonging to a D7 bit column.

Thereinafter, the system controller 33 repeatedly outputs the selection signal SEL to allow the multiplexer 34 to repeatedly select the input terminals X7, X6 and X5 four times, so that the printing with respect to each bit column for expressions of high gradation can be performed.

In the description thus made, by distinguishing the 8-bit capable of expressing 256 gradations into low gradation data and high gradation data, the D7, D6 and D5 bit columns have been distinguished into high gradation data and D4, D3, D2, D1 and D0 bit columns have been distinguished into low gradation data. However, the above distinction is just for one embodiment and the distinction can be made freely.

Furthermore, in the description thus made, the explanation has been made for a case where the printing is performed by repetition of high gradation data 4 times. However, the repetition frequency is not limited in the present invention.

Furthermore, in the above description, though the explanation has been made only with reference to a multiplexer as the data output means for distinguishing and providing both high gradation and low gradation picture data, it should be apparent that the present invention includes an apparatus wherein the picture data output from the line memory as illustrated in FIG. 1 can be compared with the value counted by the gradation counter to thereafter be output.

As seen from the foregoing, according the present invention of gradation data processing method and apparatus therefor in a printer, an effect of reducing the printing time can be obtained by reducing the data amount transmitted to the thermal print head without increasing the line memory.

Furthermore, another effect of quickly performing the printing can be achieved with a circuit of simple construction not utilizing the gradation counter, gradation comparator and the like.

Still furthermore, another effect of the invention is that a high quality picture can be obtained by allowing the low gradation expression to be performed in a mid portion of one line printing time to thereby concentrate the energy; a mild tone can be obtained by allowing the high gradation to be performed evenly during printing times other than the time of low gradation expression, so that energy can be applied evenly.

The foregoing description and drawings are illustrative and are not to be taken as limiting. Still other variations and modifications are possible without departing from the spirit and scope of the present invention.

Specifically, the foregoing description of the preferred embodiment has been presented for the purpose of expressing 256 gradations by utilizing an 8-bit picture data but it should be noted that a printer realizing the expression of 64 gradations, 128 gradations and the like is possible in light of the above teaching.

Furthermore, a construction of printer materializing the technical teaching of the present invention is possible even in a method not utilizing the sublimating heat transferring method.

What is claimed is:

1. A gradation data processing method for a printer for printing lines, said printer having a heating element, said method comprising the steps of:

(a) storing, per line, an N-bit picture data for expressing $2^N$ gradations, wherein N is an integer >1;

(b) reading, per predetermined bit column, the N-bit picture data for expressing the $2^N$ gradations, wherein step b) comprises the steps of:

(d) repeatedly reading the picture data for expression of high gradation among the N-bit picture data at least more than one time per the predetermined bit column;

(e) reading the picture data for expression of low gradation among the N-bit picture data per the predetermined bit column after the first high gradation read step is completed; and (f) repeatedly reading the picture data for expression of high gradation among the N-bit picture data at least more than one time per the predetermined bit column after the low gradation read step is completed; and (c) printing with said heating element, per the predetermined bit column, the picture data read during said step (b), wherein the picture data represents a respective different heating time of said heating element per the predetermined bit column.

2. A gradation data processing method for a printer defined in claim 1, wherein the heating time for the predetermined bit column of the N-bit picture data designates (2m) t, where t is a time needed for expression of one gradation and m is a non-negative integer representing a bit column.

3. A gradation data processing method for a printer as defined in claim 1, wherein step (b) comprises reading the N-bit picture data for expressing the $2^N$ gradations in an order from a most significant bit to a least significant bit.

4. A gradation data processing method for a printer as defined in claim 1, wherein step (b) comprises reading the N-bit picture data for expressing the $2^N$ gradations in an order from a least significant to a most significant bit.

5. A gradation data processing method for a printer for printing lines, said printer having a heating element, said method comprising the steps of:

(a) storing, per line, an N-bit picture data for expressing b $2^N$ gradations, wherein N is an integer >1;

(b) reading, per predetermined bit column, the N-bit picture data for expressing the $2^N$ gradations; and (c) printing, per the predetermined bit column, the picture data read during said step (b), wherein the picture data represents a respective different heating time per the predetermined bit column, where step (c comprises:

(g) heating the heating element for as long as 1/(2n), wherein n is a frequency of reading the picture data for expression of high gradation, out of a total time for expression of high gradation to thereby print the high gradation per the predetermined bit column of the picture data read for the expression of high gradation;

(h) heating the heating element for a time needed for expression of low gradation per the predetermined bit column of the picture data read for expression of low gradation to thereby print the low gradation; and (i) heating the heating element as long as 1/(2n) per the predetermined bit column of the picture data read for expression of high gradation to thereby print the high gradation.

6. A gradation data processing method for a printer as defined in claim 5, wherein the heating time per the predetermined bit column designates (2m)t, where t is a time needed for expression of one gradation and m is a non-negative integer representing a bit column.

7. A gradation data processing method for a printer for printing lines, said printer having a heating element, said method comprising the steps of:

(a) storing, per line, a picture data for expressing $2^N$ gradations;

(b) reading the stored picture data during a first predetermined period wherein low gradation data of said picture data is read during a substantially mid period of said first predetermined period and high gradation data of said picture data is read during each of beginning and ending periods of said first predetermined period; and (c) heating the heating element during a second predetermined period in which said heating occurs during substantially a mid period of said second predetermined period in accordance with said low gradation data and heating the heating element during said second predetermined period in which said heating occurs in accordance with said high gradation data during each of said beginning and ending periods of said second predetermined period.

8. A gradation data processing method for a printer as defined in claim 7, wherein step (b) comprises:

(d) repeatedly reading the picture data for expression of high gradation at least more than one time;

(e) reading the picture data for expression of low gradation after the first high gradation read step is completed; and (f) repeatedly reading the picture data for expression of high gradation at least more than one time after the low gradation read step is completed.

9. A gradation data processing method for a printer as defined in claim 7, wherein the picture data represents N-bit picture data for expressing the $2^N$ gradation and is read per predetermined bit column.

10. A gradation data processing method for a printer as defined in claim 7, wherein step (c) comprises:

(g) heating the heating element for as long as 1/(2n), where n represents a frequency of reading the picture data for expression of high gradation, out of the heating time of the heating element for expression of high gradation in accordance with the picture data read for expression of high gradation;

(h) printing the low gradation by heating the heating element for a time for expression of low gradation in accordance with the picture data read for expression of low gradation; and (i) printing the high gradation by heating the heating element for as long as 1/(2n) in accordance with the picture data read for expression of high gradation.

11. A gradation data processing method for a printer as defined in claim 7, wherein the heating time of the heating element per the predetermined bit column designates (2m)t, where t is a time needed for expression of one gradation and m is a non-negative integer representing a bit column.

* * * * *